Figure 1:
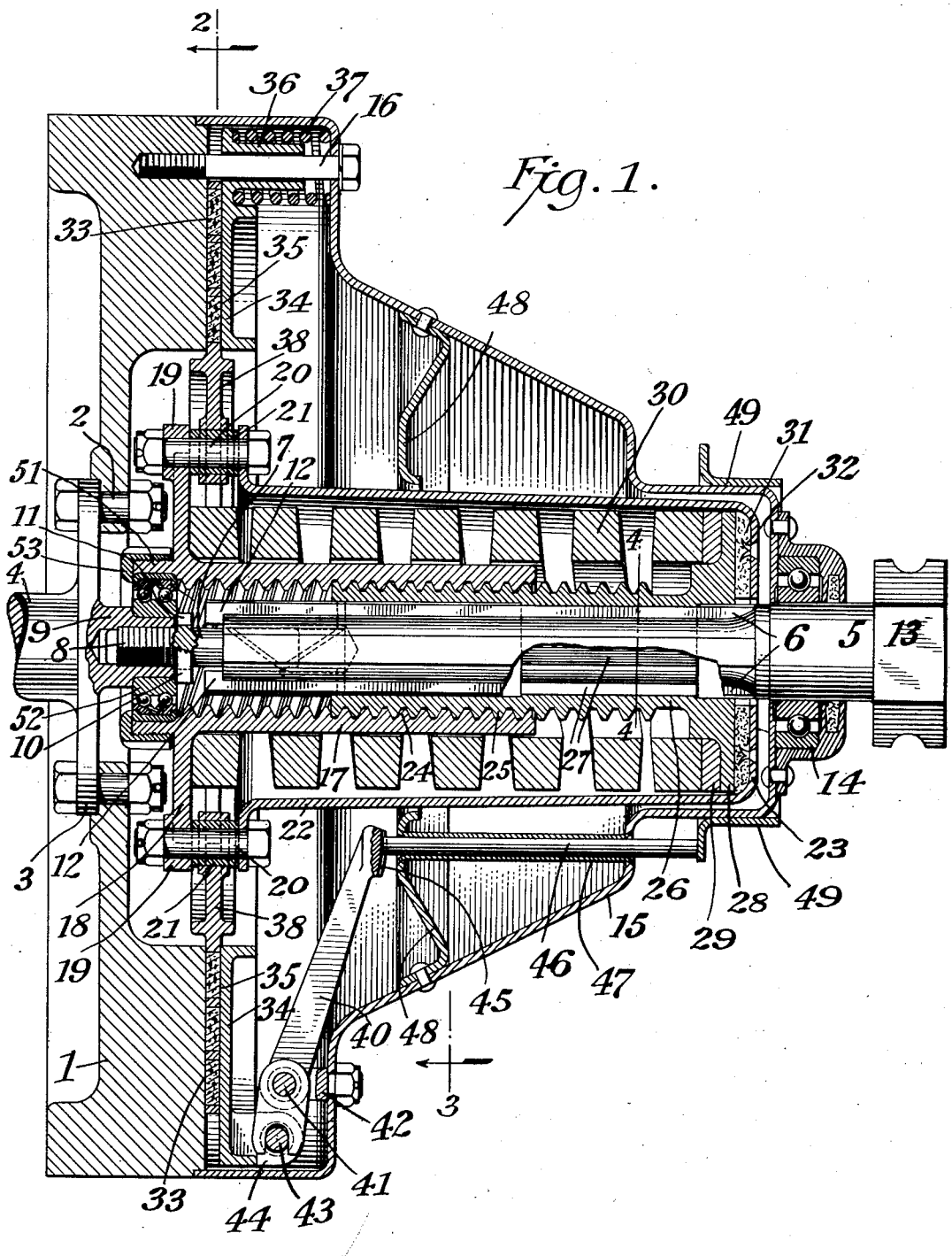

S. I. PRESCOTT.
CLUTCH.
APPLICATION FILED DEC. 18, 1913.

1,114,035.

Patented Oct. 20, 1914.
2 SHEETS—SHEET 1.

Witnesses:
A. R. Appleman
W. H. Hawkins

Inventor
Sydney I. Prescott

S. I. PRESCOTT.
CLUTCH.
APPLICATION FILED DEC. 18, 1913.
1,114,035.
Patented Oct. 20, 1914.
2 SHEETS—SHEET 2.
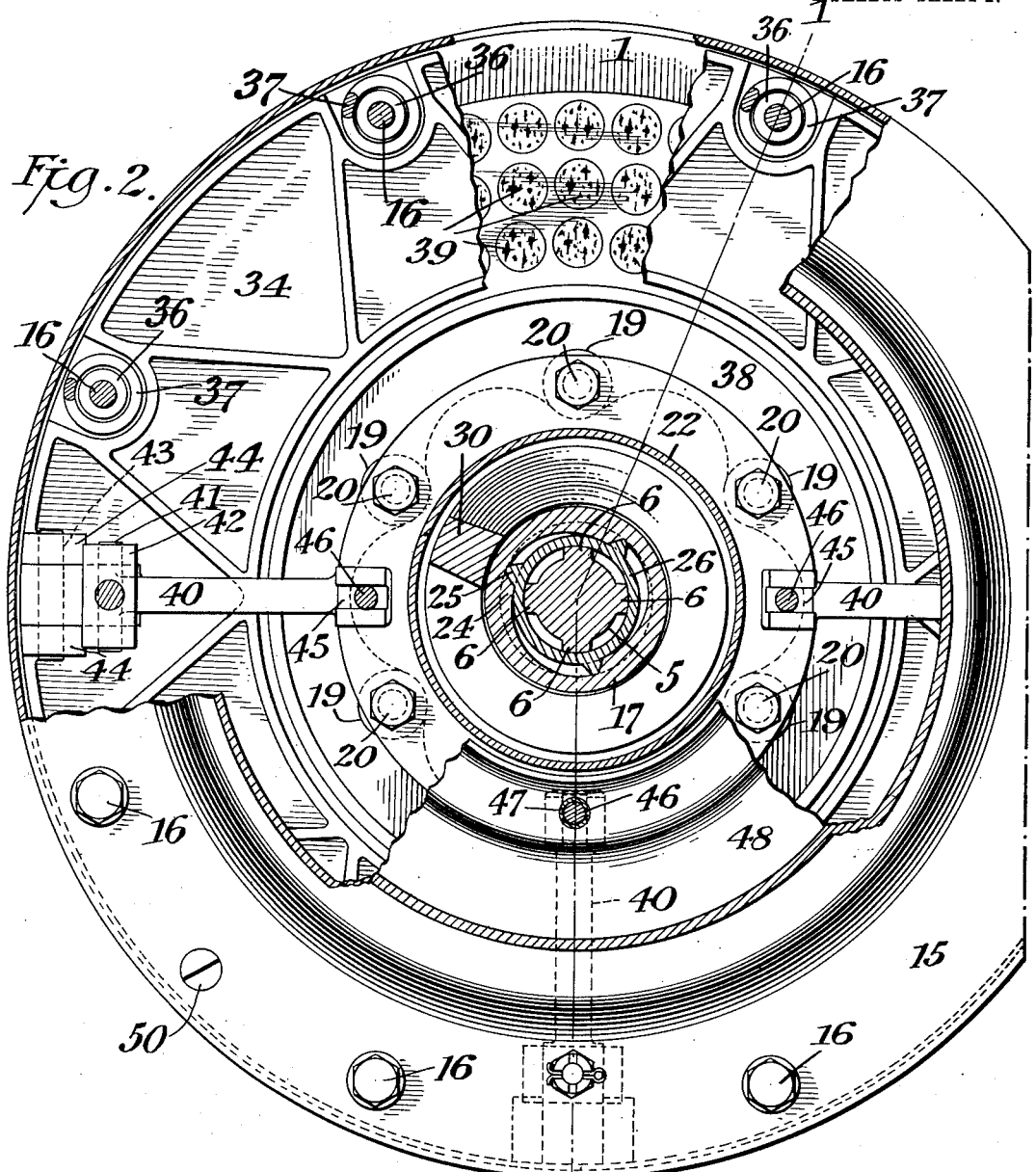
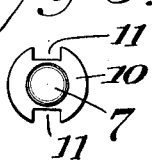
Witnesses:
A. R. Appleman
W. H. Hawkins
Inventor
Sydney I. Prescott

UNITED STATES PATENT OFFICE.

SYDNEY I. PRESCOTT, OF BROOKLYN, NEW YORK, ASSIGNOR TO MOTORFLEX EQUIPMENT COMPANY, OF NEW YORK, N. Y., A CORPORATION OF NEW YORK.

CLUTCH.

1,114,035.  Specification of Letters Patent.  Patented Oct. 20, 1914.

Application filed December 18, 1913. Serial No. 807,404.

*To all whom it may concern:*

Be it known that I, SYDNEY I. PRESCOTT, a citizen of the United States, residing at Brooklyn, county of Kings, and State of New York, have invented a new and useful Improvement in Clutches, of which the following is a specification.

This invention relates to an improvement in clutches, particularly those of the type used in the driving mechanism of motor cars or automobiles.

In Letters Patent of the United States, No. 1049531 and No. 1049532, granted to me January 7, 1913, there is disclosed a shock absorbing clutch; and for a full description of the objects, principle of operation and advantages of this type of clutch, reference is made to said patents.

The present invention is an improvement over that disclosed in the patents referred to, having for its main object the production of a device whereby a still more flexible connection may be made between a motor driven member and the drive line.

With this and other objects not specifically mentioned in view, the invention consists in certain combinations and constructions which will be hereinafter fully described and then specifically pointed out in the claims hereunto appended.

In the accompanying drawings, which form a part of this specification and in which like characters of reference indicate the same or like parts, Figure 1 is a longitudinal section of a device constructed in accordance with the invention, the view being taken on the line 1—1 in Fig. 2. Fig. 2 is a sectional view taken on the line 2—3 in Fig. 1, certain parts being broken away to more clearly illustrate the various parts. Fig. 3 is a detailed end view of a removable tail shaft used for locking certain parts together and for piloting certain other parts. And Fig. 4 is a cross sectional view taken on the line 4—4 in Fig. 1.

In carrying the invention into effect, there is provided a motor driven member, a transmission shaft, means interposed between the motor driven member and the transmission shaft for absorbing shock due to variations in speed of the motor driven member and the transmission shaft said means including operating connections and a longitudinally immovable member, a clutch member interposed between the motor driven member and the longitudinally immovable member, and connections for controlling relative movement of said clutch member and said motor driven member in and out of driving engagement. All of these elements may be varied in construction within wide limits.

In the best constructions, when the device is to be used as a part of the drive line of an automobile, the motor driven member above referred to may be formed by the flywheel of the motor; and in the particular device selected to illustrate the invention, there is provided a flywheel or motor driven member 1, secured by means of bolts 2 to a flange 3, formed upon a crankshaft 4, which is the crankshaft of the motor, not shown. There is further provided a transmission shaft 5 and means for clutching said shaft to the flywheel or motor driven member 1. For purposes to be hereinafter explained, the transmission shaft 5 is provided with a series of integral splines 6 extending throughout the greater part of its length. The forward end (at the left in Fig. 1) of the transmission shaft 5 is piloted upon a tail shaft 7. Although not essential in all constructions, the tail shaft in the device illustrated is removably connected with the crankshaft 4 at the axis of the flywheel or motor driven member. This connection is effected by providing the forward end of the tail shaft 7 with a thread 8 screwing into a boss 9 formed upon the rear end of the crankshaft 4. The tail shaft 7 is further provided with a flange 10 provided with diametrically opposed recesses 11 (see Fig. 3). At the forward end of the transmission shaft 5, two of the integral splines 6, which are diametrically opposed, project beyond the forward end of the transmission shaft and are adapted for engagement with the recesses 11 for the purpose of screwing the tail shaft 7 in and out of position. The projecting ends referred to are each marked 12. It will be readily understood that by moving the transmission shaft forward until the projecting ends or lugs 12 engage the recesses 11 of the tail shaft flange 10, the tail shaft may be readily locked in or removed from the position shown in Fig. 1. At the rear end of the transmission shaft 5 is an integral head 13 substantially hexagonal in cross section and adapted for connection with the drive line to the rear thereof. In certain constructions, as for instance when the device is used in connection with what is known as a unit type motor and gear set, the transmission shaft 5 will be otherwise formed at its rear end. At a point adjacent this rear end, the transmission shaft is supported by a ball bearing 14 of well known construction. This ball bearing is carried by an inclosing housing 15 formed of pressed steel and secured to the flywheel or motor driven member 1 by means of a series of eight bolts 16. It is of course obvious that the number of bolts, when bolts are used, may be varied; and it is also obvious that other means for securing the inclosing housing and the flywheel 1 may be utilized if desired. From the foregoing it will be readily understood that this housing is carried by and forms a part of the flywheel 1; and that the bearing 14 and the tail shaft 7, upon which the forward end of the transmission shaft 5 is piloted, keep said transmission shaft always accurately in alinement with the axis of the crankshaft 4 and flywheel or motor driven member 1. It will be readily understood further that the inclosing housing 15 performs two distinct functions; that is, it serves to retain lubricant and exclude dust, and it also operates as a part of the flywheel or motor driven member 1.

Means are interposed between the flywheel or motor driven member 1 and the transmission shaft 5 for absorbing shock due to variations in speed of the motor driven member and the transmission shaft, said means including operating connections and a longitudinally immovable member. This longitudinally immovable member in the device selected to illustrate the invention consists of a sleeve 17 having, in a transverse plane adjacent its forward end, a flange 18 provided with six bosses 19 symmetrically arranged around its periphery, and each of these bosses carries a bolt 20. The bolts pass through spacing sleeves 21 and also through a flange formed on a pressed steel casing 22 extending rearwardly to a point adjacent the bearing 14 where the casing is turned inwardly close to the transmission shaft 5, the inwardly turned end being marked 23. The sleeve 17 is provided with a multiple internal V-thread 24, this particular type of thread not being essential but being desirable because it provides a greater frictional surface for a given over-all length than can be secured with a square thread like that shown in my earlier Patents, No. 1049531 and No. 1049532. The fact that a greater surface can be obtained for a given over-all length by the use of this particular form of thread also enables me to shorten the device as a whole without sacrificing frictional driving surface of the thread. The internal thread 24 is in engagement with a corresponding external thread 25 formed upon a transmission member or nut 26, which is rotatable with and longitudinally movable with respect to the transmission shaft. While in certain constructions, the connection between this nut and the transmission shaft might be different; as shown, the nut 26 is provided with recesses 27 in which the splines 6 of the transmission shaft 5 are slidably mounted. By an inspection of Fig. 1, it will be noted that that portion of the nut 26 which is provided with the recesses 27 is considerably shorter than the nut itself, being short enough to be readily machined and being long enough to insure wide bearing surface, and consequently long life. The nut 26 is provided at its rear end with a flange 28, and against this flange rests a hardened steel ring or washer 29. Bearing against this washer 29 and also against the flange 18 before referred to, is a heavy compression spring 30 coiled around the sleeve 17 before referred to. Interposed between the flange 28 and the end 23 of the casing 22 is a cushioning washer 31 held in place by a series of split fasteners 32. The particular function of this cushioning device is to soften the blow and deaden the noise when the nut reaches the extreme of its rearward movement.

A clutch member is interposed between the motor driven member or flywheel 1 and the longitudinally immovable member or sleeve 17 and connections are provided for controlling the relative movement of said clutch member and said motor driven member in and out of driving engagement and this clutch member and these connections may be varied in construction within wide limits. Although not essential in all constructions, the motor driven member 1 is made up of two flywheel sections, one section embracing the flywheel proper which is provided with a frictional driving surface 33. The other section of the flywheel is longitudinally movable and consists of an annular plate section 34 provided with a frictional driving surface 35, the two frictional driving surfaces referred to being oppositely disposed as is clearly shown in Fig. 1. The plate section 34 is ribbed, as shown in Fig. 2, to stiffen the same and to prevent its buckling when under pressure, and at a point adjacent its periphery is provided with a series of bosses 36 through which the bolts 16 pass. It will be readily understood that by means of this construction, the plate section 34 always rotates with the main section of the flywheel 1, but is longitudinally movable with respect thereto. Coiled around each of the bosses 36 is a spring 37, the function of which is to normally press the plate section 34 toward the main section of the flywheel 1.

For the purpose of transmitting motion from the flywheel to the sleeve 17, there is provided a clutch member 38 longitudinally movable upon the spacing sleeves 21 before referred to. This clutch member has two frictional driving surfaces located between the frictional driving surfaces 33 and 35 of the flywheel sections before referred to, and that portion of the clutch member 38 lying between said frictional driving surfaces is studded with inserted corks 39. The cork inserts are desirable on account of their high coefficient of friction, but are not absolutely necessary and may, in certain constructions, be dispensed with. It will be readily understood that when the parts are in the position shown in Fig. 1, the clutch member 38 is clamped between the main flywheel section and the plate section 34, so that the sleeve 17 and the casing 22 will be rotated as the flywheel rotates.

Means are provided for separating the flywheel sections and thereby releasing the clutch member 38; and in the device selected to illustrate the invention, this means consists of a series of four levers 40. These levers are fulcrumed at 41 to yokes 42, which in turn are bolted to the inclosing housing 15, as clearly shown in Fig. 1. The outer arm of each lever is provided with a slot engaging a stud 43 secured to bosses 44 formed on the plate section 34 before referred to. The inner end of each lever 40 is provided with a slotted head 45. While other means for simultaneously operating these levers may be employed in certain constructions, there is shown a plurality of plungers 46 the forward end of each of which abuts against the slotted head 45 of one of the levers 40 just described. Each of the plungers 46 slides in a tube 47. One end of each tube is expanded in a suitable aperture in the inclosing housing 15, and the other end is expanded in a suitable aperture in a stiffening web 48 which is riveted to the inclosing housing. When a series of plungers is used for operating the levers, some means will be employed for simultaneously operating the plungers. In the device illustrated, this means consists of a flanged ring 49 surrounding the rear end of the housing 15 and abutting against the rear ends of the plungers. The flanged ring 49 may be operated by connections of a well known character including a pedal. The clutch member 38 will operate when dry or when running in a bath of lubricant; and when it is desired to run it in a bath of lubricant, the device may be provided with a screw plug threaded in the housing 15 at a point adjacent its outermost periphery. It is obvious that the filling plug may also be used for drainage purposes. Such plugs are common and well known in the art and one is indicated at 50 in Fig. 2.

The sleeve 17 is provided at its forward end with a cylindrical extension 51. Within this extension is located a combined radial and thrust bearing 52 of well known construction. The outer member of this bearing is held fast to the cylindrical extension by means of a lock nut 53 threaded upon the cylindrical extension 51. The inner member of the thrust bearing 52 rests upon the boss 9, and when the parts are assembled, is locked thereupon by means of the flange 10 of the tail shaft 7 before referred to. It will be readily understood that the thrust bearing 52 prevents longitudinal movement of the sleeve 17 and that the clutch member 38 floats fore and aft or is longitudinally movable with respect to the sleeves 21 carried by the flange 18 of the sleeve 17; and it will be readily understood that when the clutch is disengaged, the clutch member 38 floats to a neutral position between the separated flywheel sections. When it is desired to clutch the rotating motor driven member to the transmission shaft, pressure upon the flanged ring 49 through the well known mechanism referred to, but not shown, is removed. The springs 37 then come into action to force the plate section 34 toward the longitudinally immovable section of the flywheel 1. As the plate section 34 moves forward, it comes into contact with the rear side of the clutch member 38 and the generation of friction between the two begins. The plate section 34 continues to move forward carrying with it the clutch member 38 until the latter is firmly clamped between said plate section and the main section of the flywheel 1. When this occurs, the sleeve 17 will be rotated at the same speed as the flywheel. As the load upon the transmission shaft 5 resists any sudden turning of said shaft, the rotating sleeve 17, by means of its threaded engagement with the nut 26, operates to pull the latter within itself and thereby compress the absorption spring 30. As the spring is compressed, the pressure upon the friction of the contacting frictional surfaces of the threads of the sleeve 17 and nut 26 increases in a greater ratio than the increase in the area of said surfaces as the nut goes into the sleeve. The effective result is a progressively increasing turning effort upon the transmission shaft 5 whereby sudden shock to said transmission shaft and the drive line to which it is connected is completely eliminated. It will be readily understood that since shock is eliminated, more power may be developed in the motor by a higher speed of rotation when the clutching action takes place than is possible in the absence of a shock absorbing device; and that a quicker get-away can be made through the agency of the greater power initially exerted than is possible in the absence of a shock absorbing device. The action of the device after clutching takes place is precisely the same as the action of the devices disclosed in my Patents No. 1049531 and No. 1049532. It is therefore deemed unnecessary to repeat a description of this action herein.

Changes and variations may be made in the device by means of which the invention is carried into effect. The invention is therefore not to be restricted to the precise details of the structure shown and described.

What is claimed is:

1. The combination with a motor driven member, of a transmission shaft, means interposed between the motor driven member and the transmission shaft for absorbing shock due to variations in speed of the motor driven member and the transmission shaft said means including operating connections and a longitudinally immovable member and being arranged to transmit power without yielding under a load below normal but arranged to yield to a limited extent under load above normal, a clutch member interposed between the motor driven member and the longitudinally immovable member, and connections for controlling relative movement of said clutch member and said motor driven member in and out of driving engagement.

2. The combination with a longitudinally immovable motor driven member, of a transmission shaft, means interposed between the motor driven member and the transmission shaft for absorbing shock due to variations in speed of the motor driven member and the transmission shaft said means including operating connections and a longitudinally immovable member and being arranged to transmit power without yielding under a load below normal but arranged to yield to a limited extent under load above normal, a longitudinally movable clutch member interposed between the motor driven member and the longitudinally immovable member, and connections for controlling movement of said clutch member in and out of driving engagement with the motor driven member.

3. The combination with a motor driven member, of a transmission shaft, means interposed between the motor driven member and the transmission shaft for absorbing shock due to variations in speed of the motor driven member and the transmission shaft said means including operating connections and a longitudinally immovable member and being arranged to transmit power without yielding under a load below normal but arranged to yield to a limited extent under load above normal, a clutch member supported by and rotatable with the longitudinally immovable member, and connections for controlling relative movement of said clutch member and said motor driven member in and out of driving engagement.

4. The combination with a motor driven member having a frictional driving surface, of a transmission shaft, means interposed between the motor driven member and the transmission shaft for absorbing shock due to variations in speed of the motor driven member and the transmission shaft said means including operating connections and a longitudinally immovable member and being arranged to transmit power without yielding under a load below normal but arranged to yield to a limited extent under load above normal, a longitudinally floating member supported by and rotatable with the longitudinally immovable member and having a frictional driving surface adapted for engagement with the frictional driving surface of the motor driven member, and connections for controlling movement of said floating member in and out of engagement with the motor driven member.

5. The combination with a motor flywheel having a frictional driving surface, of a transmission shaft, means interposed between the motor flywheel and the transmission shaft for absorbing shock due to variations in speed of the motor flywheel and the transmission shaft said means including operating connections and a longitudinally immovable member and being arranged to transmit power without yielding under a load below normal but arranged to yield to a limited extent under load above normal, a longitudinally floating member supported by and rotatable with the longitudinally immovable member and having a frictional driving surface adapted for engagement with the frictional driving surface of the motor flywheel, and connections for controlling movement of said floating member in and out of engagement with the motor flywheel.

6. The combination with a motor flywheel having a longitudinally immovable section and having a longitudinally movable section the sections being provided with oppositely disposed frictional driving surfaces, of a transmission shaft, means interposed between the motor flywheel and the transmission shaft for absorbing shock due to variations in speed of the motor flywheel and the transmission shaft said means including operating connections and a longitudinally immovable member and being arranged to transmit power without yielding under a load below normal but arranged to yield to a limited extent under load above normal, a longitudinally floating member supported by and rotatable with the longitudinally immovable member and having frictional driving surfaces located between and adapted for engagement with the frictional driving surfaces of the motor flywheel, and connections for controlling movement of said floating member in and out of engagement with the motor flywheel.

7. The combination with a motor flywheel having a longitudinally immovable section and having a longitudinally movable section the sections being provided with oppositely disposed frictional driving surfaces, of a transmission shaft, means interposed between the motor flywheel and the transmission shaft for absorbing shock due to variations in speed of the motor flywheel and the transmission shaft said means including operating connections and a longitudinally immovable member and being arranged to transmit power without yielding under a load below normal but arranged to yield to a limited extent under load above normal, a longitudinally floating member supported by and rotatable with the longitudinally immovable member and having frictional driving surfaces located between and adapted for engagement with the frictional driving surfaces of the motor flywheel, connections for controlling movement of said floating member in and out of engagement with the motor flywheel, and an inclosing housing carried by and forming a part of said motor flywheel for retaining lubricant and excluding dust.

8. The combination with a motor flywheel having a longitudinally immovable section and having a longitudinally movable section the sections being provided with oppositely disposed frictional driving surfaces, of a transmission shaft, means interposed between the motor flywheel and the transmission shaft for absorbing shock due to variations in speed of the motor flywheel and the transmission shaft said means including operating connections and a longitudinally immovable member and being arranged to transmit power without yielding under a load below normal but arranged to yield to a limited extent under load above normal, a longitudinally floating member supported by and rotatable with the longitudinally immovable member and having frictional driving surfaces located between and adapted for engagement with the frictional driving surfaces of the motor flywheel, connections for controlling movement of said floating member in and out of engagement with the motor flywheel, and an inclosing housing carried by and forming a part of said motor flywheel for retaining lubricant and excluding dust, and a bearing caried by said housing for supporting the transmission shaft.

9. The combination with a motor flywheel having a longitudinally immovable section and having a longitudinally movable section the sections being provided with oppositely disposed frictional driving surfaces, of a transmission shaft, means interposed between the motor flywheel and the transmission shaft for absorbing shock due to variations in speed of the motor flywheel and the transmission shaft said means including operating connections and a longitudinally immovable member, a longitudinally floating member supported by and rotatable with the longitudinally immovable member and having frictional driving surfaces located between and adapted for engagement with the frictional driving surfaces of the motor flywheel, a plurality of springs pressing against the longitudinally movable section of the motor flywheel to normally cause the frictional driving surfaces of the longitudinally floating member to be engaged by the frictional driving surfaces of the motor flywheel sections, a plurality of levers engaging the longitudinally movable section of the motor flywheel, and means for simultaneously operating said levers to produce a movement of the longitudinally movable section of the motor flywheel whereby the longitudinally floating member is released.

10. The combination with a motor flywheel having a longitudinally immovable section and having a longitudinally movable section the sections being provided with oppositely disposed frictional driving surfaces, of a transmisson shaft, means interposed between the motor flywheel and the transmission shaft for absorbing shock due to variations in speed of the motor flywheel and the transmission shaft said means including operating connections and a longitudinally immovable member, a longitudinally floating member supported by and rotatable with the longitudinally immovable member and having frictional driving surfaces located between and adapted for engagement with the frictional driving surfaces of the motor flywheel, a plurality of springs pressing against the longitudinally movable section of the motor flywheel to normally cause the frictional driving surfaces of the longitudinally floating member to be engaged by the frictional driving surfaces of the motor flywheel sections, a plurality of levers engaging the longitudinally movable section of the motor flywheel, a plurality of plungers engaging the levers, and means for simultaneously operating said plungers to produce a movement of the longitudinally movable section of the motor flywheel whereby the longitudinally floating member is released.

11. The combination with a motor flywheel having a longitudinally immovable section and having a longitudinally movable section the sections being provided with oppositely disposed frictional driving surfaces, of a transmission shaft, means interposed between the motor flywheel and the transmission shaft for absorbing shock due to variations in speed of the motor flywheel and the transmission shaft said means including operating connections and a longitudinally immovable member, a longitudinally floating member supported by and rotatable with the longitudinally immovable member and having frictional driving surfaces located between and adapted for engagement with the frictional driving surfaces of the motor flywheel, an inclosing housing carried by and forming a part of said motor flywheel for retaining lubricant and excluding dust, a plurality of tubes longitudinally mounted in the housing, and operating connections for controlling movement of said floating member in and out of engagement with the motor flywheel said connections including a plurality of plungers slidably mounted in the housing tubes.

12. The combination with a motor driven member, of a transmission shaft, an internally threaded sleeve longitudinally immovable with respect to the motor driven member, an externally threaded nut rotatable with and longitudinally movable with respect to the transmission shaft and in threaded engagement with said sleeve, a pressure device controlling the friction of said sleeve and nut, and means for clutching said sleeve to the motor driven member.

13. The combination with a motor driven member, of a transmission shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, and means for clutching said sleeve to the motor driven member.

14. The combination with a motor driven member, of a transmission shaft, an internally V-threaded sleeve longitudinally immovable with respect to the motor driven member, an externally V-threaded nut splined and longitudinally movable on the transmission shaft and in threaded engagement with said sleeve, a pressure device controlling the friction of said sleeve and nut, and means for clutching said sleeve to the motor driven member.

15. The combination with a motor driven member, of a transmission shaft, an internally threaded sleeve longitudinally immovable with respect to the motor driven member, an externally threaded nut splined and longitudinally movable on the transmission shaft and in threaded engagement with said sleeve, a compression spring controlling the friction of said sleeve and nut, and means for clutching said sleeve to the motor driven member.

16. The combination with a motor driven member, of a transmission shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, means for clutching said sleeve to the motor driven member, and an inclosing housing carried by and forming a part of the motor driven member for retaining lubricant and excluding dust.

17. The combination with a motor driven member, of a transmission shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, means for clutching said sleeve to the motor driven member, and a cushioning device adapted for engagement with said nut at one end of its path of movement.

18. The combination with a motor driven member, of a tail shaft mounted at the axis of said member, a transmission shaft piloted on said tail shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, and means for clutching said sleeve to the motor driven member.

19. The combination with a motor driven member, of a removable tail shaft mounted at the axis of said member, a transmission shaft piloted on said removable tail shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, and means for clutching said sleeve to the motor driven member.

20. The combination with a motor driven member, of a transmission shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, means for clutching said sleeve to the motor driven member, an inclosing housing for retaining lubricant and excluding dust, and a bearing carried by the housing for supporting said transmission shaft.

21. The combination with a motor driven member, of a tail shaft mounted on the axis of said member, a transmission shaft piloted on said tail shaft, an internally threaded sleeve longitudinally immovable with respect to the motor driven member, an externally threaded nut splined and longitudinally movable on the transmission shaft and in threaded engagement with said sleeve, a pressure device controlling the friction of said sleeve and nut, means for clutching said sleeve to the motor driven member, an inclosing housing carried by and forming a part of the motor driven member for retaining lubricant and excluding dust, and a bearing carried by the housing for supporting the transmission shaft in alinement with the axis of the motor driven member and tail shaft.

22. The combination with a motor driven member, of a transmission shaft, an internally threaded sleeve, longitudinally immovable with respect to the motor driven member, a removable tail shaft located at the axis of the motor driven member, a thrust bearing carried by the internally threaded sleeve and interposed between said tail shaft and said sleeve and locked in position by said tail shaft, an externally threaded nut splined and longitudinally movable on the transmission shaft and in threaded engagement with said sleeve, a pressure device controlling the friction of said sleeve and nut, means for clutching said sleeve to the motor driven member, an inclosing housing carried by and forming a part of the motor driven member for retaining lubricant and excluding dust, and a bearing carried by the housing for supporting the transmission shaft said transmission shaft being also piloted on said tail shaft.

23. The combination with a motor driven member, of a transmission shaft, an internally threaded sleeve longitudinally immovable with respect to the motor driven member, a removable tail shaft located at the axis of the motor driven member, a thrust bearing carried by the internally threaded sleeve and interposed between said tail shaft and said sleeve and located in position by said tail shaft, an externally threaded nut splined and longitudinally movable on the transmission shaft and in threaded engagement with said sleeve, a pressure device controlling the friction of said sleeve and nut, means for clutching said sleeve to the motor driven member, and an inclosing housing carried by and forming a part of the motor driven member for retaining lubricant and excluding dust, and a bearing carried by the housing for supporting the transmission shaft said transmission shaft being also piloted on said tail shaft and provided with means for removing said tail shaft.

24. The combination with a motor driven member, of a transmission shaft, an internally threaded sleeve longitudinally immovable with respect to the motor driven member, a removable tail shaft located at the axis of the motor driven member and provided with a locking flange having two diametrically opposed recesses, a thrust bearing carried by the internally threaded sleeve and interposed between said tail shaft and said sleeve and locked in position by the flange of said tail shaft, an externally threaded nut splined and longitudinally movable on the transmission shaft and in threaded engagement with said sleeve, a pressure device controlling the friction of said sleeve and nut, means for clutching said sleeve to the motor driven member, and an inclosing housing carried by and forming a part of the motor driven member for retaining lubricant and excluding dust, and a bearing carried by the housing for supporting the transmission shaft said transmission shaft being piloted on said tail shaft and provided with a pair of diametrically opposed lugs adapted for engagement with the recesses of the tail shaft flange for removing said tail shaft.

In testimony whereof, I have signed my name to this specification in the presence of two subscribing witnesses.

SYDNEY I. PRESCOTT.

Witnesses:
ELIZABETH LOUISE RUSSELL,
D. H. HAYNES.